US012024277B2

(12) United States Patent
Acks

(10) Patent No.: US 12,024,277 B2
(45) Date of Patent: Jul. 2, 2024

(54) ARTICULATING TRUSS CONFIGURATION FOR AIRCRAFT LANDING GEAR

(71) Applicant: GOODRICH CORPORATION, Charlotte, NC (US)

(72) Inventor: James Acks, Medina, OH (US)

(73) Assignee: GOODRICH CORPORATION, Charlotte, NC (US)

( * ) Notice: Subject to any disclaimer, the term of this patent is extended or adjusted under 35 U.S.C. 154(b) by 456 days.

(21) Appl. No.: 17/154,742

(22) Filed: Jan. 21, 2021

(65) Prior Publication Data

US 2021/0245867 A1 Aug. 12, 2021

Related U.S. Application Data

(60) Provisional application No. 62/970,906, filed on Feb. 6, 2020.

(51) Int. Cl.
*B64C 25/20* (2006.01)
*B64C 25/26* (2006.01)
*B64C 25/34* (2006.01)

(52) U.S. Cl.
CPC ............. *B64C 25/20* (2013.01); *B64C 25/26* (2013.01); *B64C 25/34* (2013.01)

(58) Field of Classification Search
CPC ......... B64C 25/10; B64C 25/12; B64C 25/14; B64C 25/18; B64C 25/20; B64C 25/22; B64C 25/24; B64C 25/26; B64C 25/34; B64C 25/36; B64C 25/66; B64C 2025/125; B64C 2025/325
See application file for complete search history.

(56) References Cited

U.S. PATENT DOCUMENTS

| 2,392,892 | A | * | 1/1946 | Ward | B64C 25/10 244/102 R |
| 3,951,361 | A | | 4/1976 | Hrusch | |
| 4,328,939 | A | * | 5/1982 | Davies | B64C 25/12 244/102 R |

(Continued)

FOREIGN PATENT DOCUMENTS

| EP | 0219724 | 4/1987 |
| EP | 2319760 | 5/2011 |

(Continued)

OTHER PUBLICATIONS

European Patnt Office, European Search Report dated Jun. 18, 2021 in Application No. 21155437.3.

*Primary Examiner* — Richard Green
*Assistant Examiner* — Colin Zohoori
(74) *Attorney, Agent, or Firm* — SNELL & WILMER L.L.P.

(57) ABSTRACT

A landing gear system for an aircraft is disclosed. In various embodiments, the system includes a truss frame pivotally connected to a frame of the aircraft and configured to rotate about an axis; a retraction actuator configured to rotate the truss frame about the axis; a first truss link pivotally connected to the truss frame; a second truss link pivotally connected to the first truss link; a truss locking link pivotally connected to the truss frame and to the second truss link; and an articulation actuator configured to pivot the first truss link with respect to the truss frame.

10 Claims, 10 Drawing Sheets

(56) References Cited

U.S. PATENT DOCUMENTS

| | | | | |
|---|---|---|---|---|
| 4,345,727 | A | * | 8/1982 | Brown .................... B64C 25/12 |
| | | | | 244/102 R |
| 5,039,033 | A | * | 8/1991 | Woerner ................ B64C 25/12 |
| | | | | 244/102 R |
| 5,086,995 | A | * | 2/1992 | Large ..................... B64C 25/34 |
| | | | | 244/102 R |
| 5,100,083 | A | | 3/1992 | Large et al. |
| 8,523,107 | B2 | | 9/2013 | Salmon et al. |
| 9,205,917 | B2 | | 12/2015 | Acks et al. |
| 10,479,486 | B2 | | 11/2019 | Ducos et al. |
| 2005/0178900 | A1 | | 8/2005 | Quayle |
| 2010/0012779 | A1 | * | 1/2010 | Collins .................. B64C 25/24 |
| | | | | 244/102 R |

FOREIGN PATENT DOCUMENTS

| | | |
|---|---|---|
| EP | 2450277 | 5/2012 |
| EP | 2987724 | 2/2016 |

* cited by examiner

ARTICULATING TRUSS CONFIGURATION FOR AIRCRAFT LANDING GEAR

CROSS-REFERENCE TO RELATED APPLICATIONS

This application claims priority to, and the benefit of, U.S. Provisional Application No. 62/970,906, filed Feb. 6, 2020 and titled "ARTICULATING TRUSS CONFIGURATION FOR AIRCRAFT LANDING GEAR," which is herein incorporated by reference in its entirety for all purposes.

FIELD

The present disclosure relates generally to aircraft landing gear and, more particularly, articulating truss configurations adapted to minimize tire lateral scuffing and to rotate the landing gear into a landing gear bay upon retraction.

BACKGROUND

Landing gear for small aircraft, such as, for examples, helicopters, are frequently designed to remain in a fixed or landing configuration throughout flight. Side articulating landing gear have been developed for helicopters and those skilled in the art appreciate the need to eliminate or at least minimize lateral side scuffing of the tires on the landing gear of helicopters. Oftentimes, the size and capacity of the landing gear bay of small aircraft or helicopters is constrained by features such as the airframe structure, the location of the cockpit, the size of the crew cabin and the location of any hydraulics or electronics bays. Consequently, the volume of available space often dictates the type of kinematic mechanism that is used to articulate the landing gear from a retracted or stowed position to an extended or deployed position.

SUMMARY

A landing gear system for an aircraft is disclosed. In various embodiments, the system includes a truss frame pivotally connected to a frame of the aircraft and configured to rotate about an axis; a retraction actuator configured to rotate the truss frame about the axis; a first truss link pivotally connected to the truss frame; a second truss link pivotally connected to the first truss link; a truss locking link pivotally connected to the truss frame and to the second truss link; and an articulation actuator configured to pivot the first truss link with respect to the truss frame.

In various embodiments, the first truss link has a first end pivotally connected to the truss frame at a first pivot axis and a second end connected to the second truss link at a second pivot axis. In various embodiments, a lever is pivotally connected to the first truss link and the second truss link at the second pivot axis. In various embodiments, a shock absorber is pivotally connected to the first truss link and to the lever. In various embodiments, an axle attachment member is pivotally connected to the lever. In various embodiments, a ground articulation link is pivotally connected to the axle attachment member. In various embodiments, a retraction articulation link is pivotally connected to the truss locking link and to the ground articulation link. In various embodiments, a spacer link connects the ground articulation link and the retraction articulation link to the first truss link.

In various embodiments, the second truss link is a left side second truss link having a first end pivotally connected to the first truss link and a second end pivotally connected to a right side second truss link. In various embodiments, the first truss link is a left side first truss link and the articulation actuator is configured to pivot the left side first truss link with respect to the truss frame and a right side first truss link with respect to the truss frame. In various embodiments, a ground articulation link is pivotally connected to an axle attachment member. In various embodiments, a retraction articulation is link pivotally connected to the truss locking link and to the ground articulation link.

In various embodiments, the first truss link has a first end pivotally connected to the truss frame at a first pivot axis and a second end connected to the second truss link at a second pivot axis further and a spacer link connects a ground articulation link and a retraction articulation link to the first truss link and to the second truss link at the second pivot axis. In various embodiments, the ground articulation link is pivotally connected to an axle attachment member and the retraction articulation link is pivotally connected to the truss locking link.

A method of stowing a landing gear system for an aircraft having a truss frame pivotally connected to a frame of the aircraft is disclosed. In various embodiments, the method includes pivoting a first truss link with respect to the truss frame to bring a wheel coupled to the first truss link toward a centerline of the aircraft; and rotating the truss frame about an axis perpendicular to the centerline to raise the wheel into a landing gear bay. In various embodiments, a first actuator is configured to pivot the first truss link with respect to the truss frame. In various embodiments, a second actuator is configured to rotate the truss frame about the axis.

A method of deploying a landing gear system for an aircraft having a truss frame pivotally connected to a frame of the aircraft is disclosed. In various embodiments, the method includes rotating the truss frame about an axis perpendicular to a centerline of the aircraft to lower a wheel coupled to a first truss link pivotally connected to the truss frame from a landing gear bay; and pivoting the first truss link with respect to the truss frame to move the wheel coupled to the first truss link away from the centerline of the aircraft. In various embodiments, a first actuator is configured to pivot the first truss link with respect to the truss frame. In various embodiments, a second actuator is configured to rotate the truss frame about the axis.

The foregoing features and elements may be combined in any combination, without exclusivity, unless expressly indicated herein otherwise. These features and elements as well as the operation of the disclosed embodiments will become more apparent in light of the following description and accompanying drawings.

BRIEF DESCRIPTION OF THE DRAWINGS

The accompanying drawings illustrate various embodiments employing the principles described herein and are a part of the specification. The illustrated embodiments are meant for description and not to limit the scope of the claims.

DETAILED DESCRIPTION

The following detailed description of various embodiments herein makes reference to the accompanying drawings, which show various embodiments by way of illustration. While these various embodiments are described in sufficient detail to enable those skilled in the art to practice the disclosure, it should be understood that other embodiments may be realized and that changes may be made without departing from the scope of the disclosure. Thus, the detailed description herein is presented for purposes of illustration only and not of limitation. Furthermore, any reference to singular includes plural embodiments, and any reference to more than one component or step may include a singular embodiment or step. Also, any reference to attached, fixed, connected, or the like may include permanent, removable, temporary, partial, full or any other possible attachment option. Additionally, any reference to without contact (or similar phrases) may also include reduced contact or minimal contact. It should also be understood that unless specifically stated otherwise, references to "a," "an" or "the" may include one or more than one and that reference to an item in the singular may also include the item in the plural. Further, all ranges may include upper and lower values and all ranges and ratio limits disclosed herein may be combined.

Figure 1A:
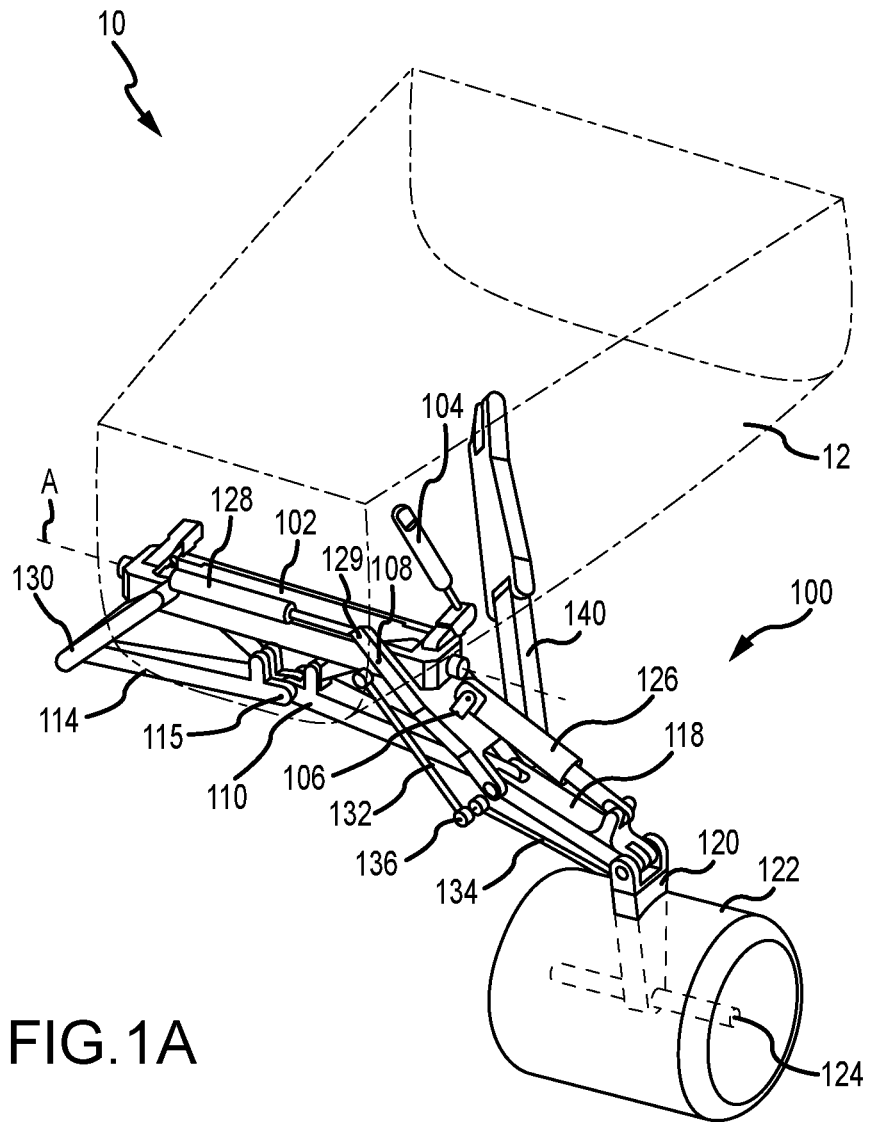
FIGS. 1A and 1B illustrate a landing gear system, in accordance with various embodiments.
Figure 1B:
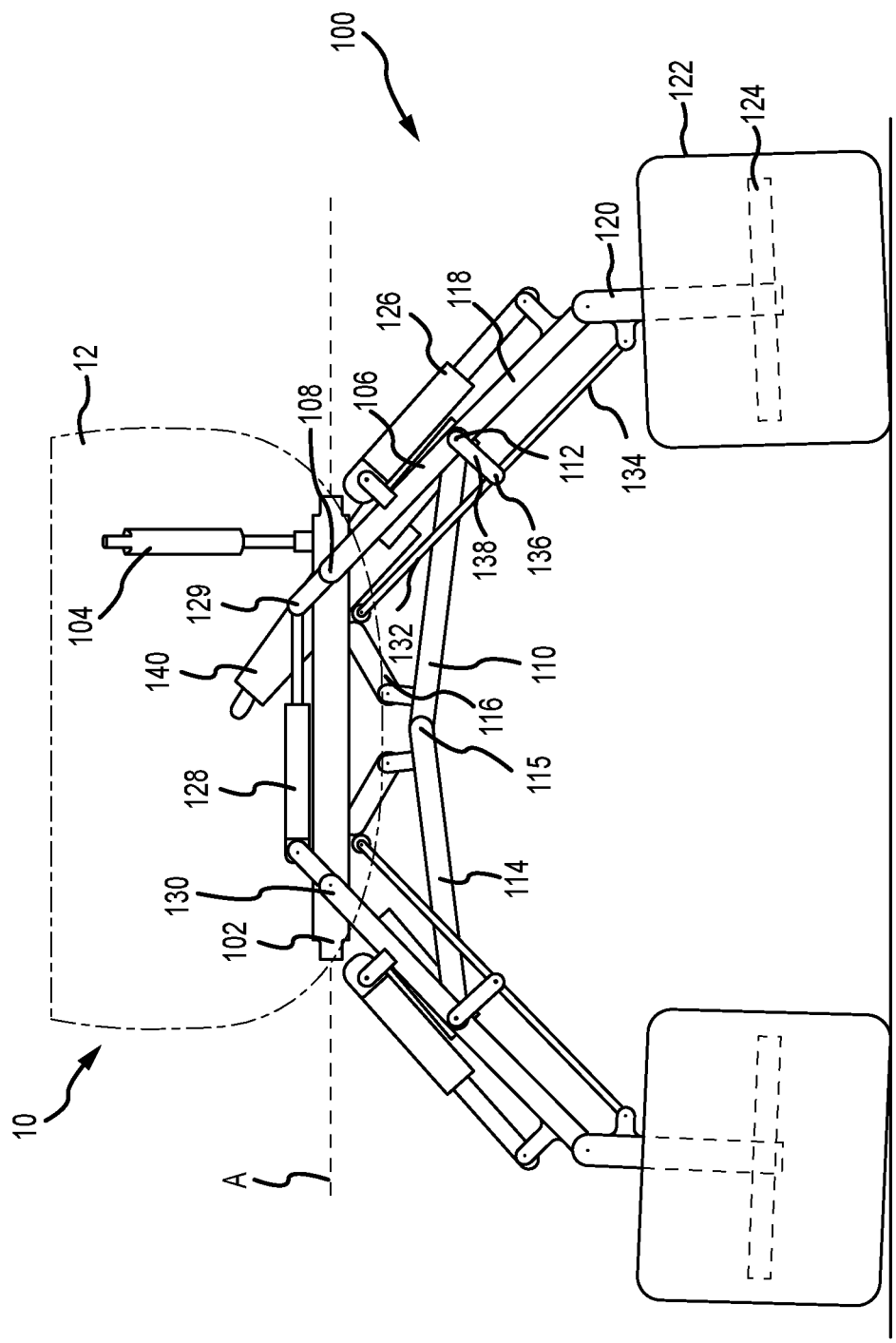

With reference to FIGS. 1A and 1B, an aircraft 10 is illustrated being supported by a landing gear system 100 positioned on both a left side and a right side of the aircraft 10. In various embodiments, the components of the landing gear system 100 are the same for the left side and the right side, so the disclosure focuses primarily on identification and operation of the components on the left side. Referring to the drawings, the landing gear system 100 includes a truss frame 102 to which the various components of the landing gear system 100 are secured. As will be described below, the truss frame is configured to pivot or rotate about an axis A that facilitates retraction of the landing gear system 100 into a landing gear bay 12 of the aircraft 10. A retraction actuator 104 (or a first actuator) having a first end connected to the truss frame 102 and a second end connected to a frame within the landing gear bay 12 controls rotation of the truss frame 102 about the axis A and retraction of the landing gear system 100 into the landing gear bay 12.

With continued reference to FIGS. 1A and 1B, the landing gear system 100 further includes a first truss link 106 having a first end pivotally connected to the truss frame 102 at a first pivot axis 108 and a second end pivotally connected to a first end of a second truss link 110 at a second pivot axis 112. The second end of the second truss link 110 (or a left side second truss link) is pivotally connected to a second truss link 114 on the right side of the aircraft 10 (or a right side second truss link) at a third pivot axis 115. A truss locking link 116 has a first end pivotally connected to the truss frame 102 at the first pivot axis 108 and a second end pivotally connected to the second truss link 110 proximate its second end. A lever 118 has a first end pivotally connected to both the first truss link 106 and to the second truss link 110 at the second pivot axis 112 and a second end pivotally connected to an axle attachment member 120 that connects a wheel 122 to the landing gear system 100 via an axle 124. A shock absorber 126 has a first end pivotally connected to the lever 118 proximate its second end and a second end pivotally connected to the first truss link 106 intermediate the first end and the second end of the first truss link 106.

An articulation actuator 128 (or a second actuator) has a first end pivotally connected to the first truss link 106 (or a left side first truss link) at a fourth pivot axis 129, with the fourth pivot axis 129 extending a distance beyond the first pivot axis 108 such that extension or retraction of the articulation actuator 128 causes the first truss link 106 to pivot with respect to the truss frame 102 about the first pivot axis 108. A second end of the articulation actuator 128 is pivotally connected to a first truss link 130 on the right side of the aircraft 10 (or a right side first truss link). A retraction articulation link 132 has a first end pivotally connected to the truss locking link 116 intermediate the first end and the second end of the truss locking link 116 and a second end pivotally connected to a first end of a ground articulation link 134 at a fifth pivot axis 136. A second end of the ground articulation link 134 is pivotally connected to the axle attachment member 120. A spacer link 138 connects the second end of the retraction articulation link 132 and the first end of the ground articulation link 134 at the fifth pivot axis 136 to the second end of the first truss link 106, the first end of the second truss link 110 and the first end of the lever 118 at the second pivot axis 112. As such, the spacer link 138 maintains a constant distance between the second pivot axis 112 and the fifth pivot axis 136. In various embodiments, a drag brace assembly 140 has a first end connected to the first truss link 106 and a second end connected to a frame within the landing gear bay 12.

Figure 2A:
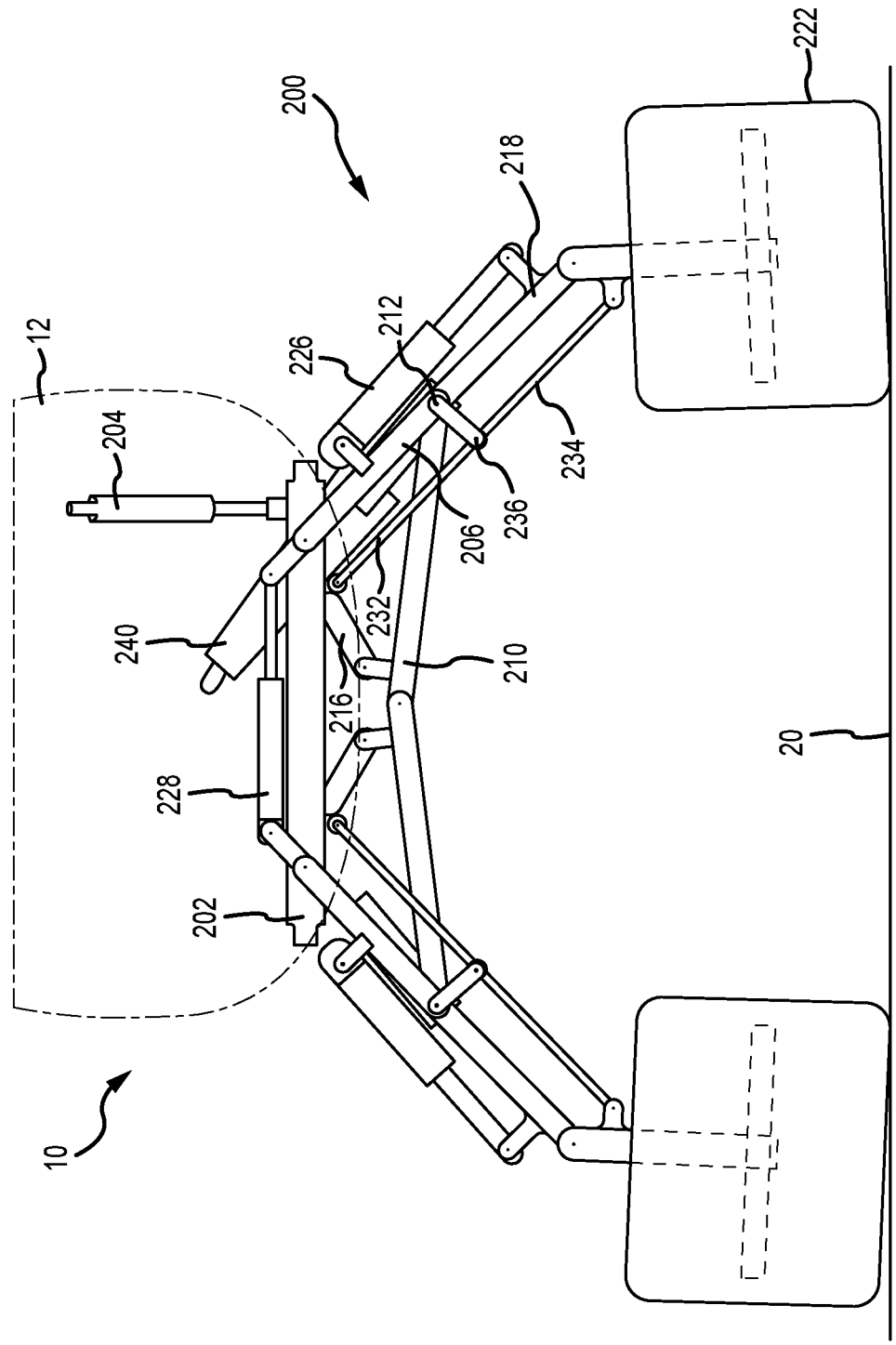
FIGS. 2A, 2B and 2C illustrate a landing sequence using a landing gear system, in accordance with various embodiments.
Figure 2B:
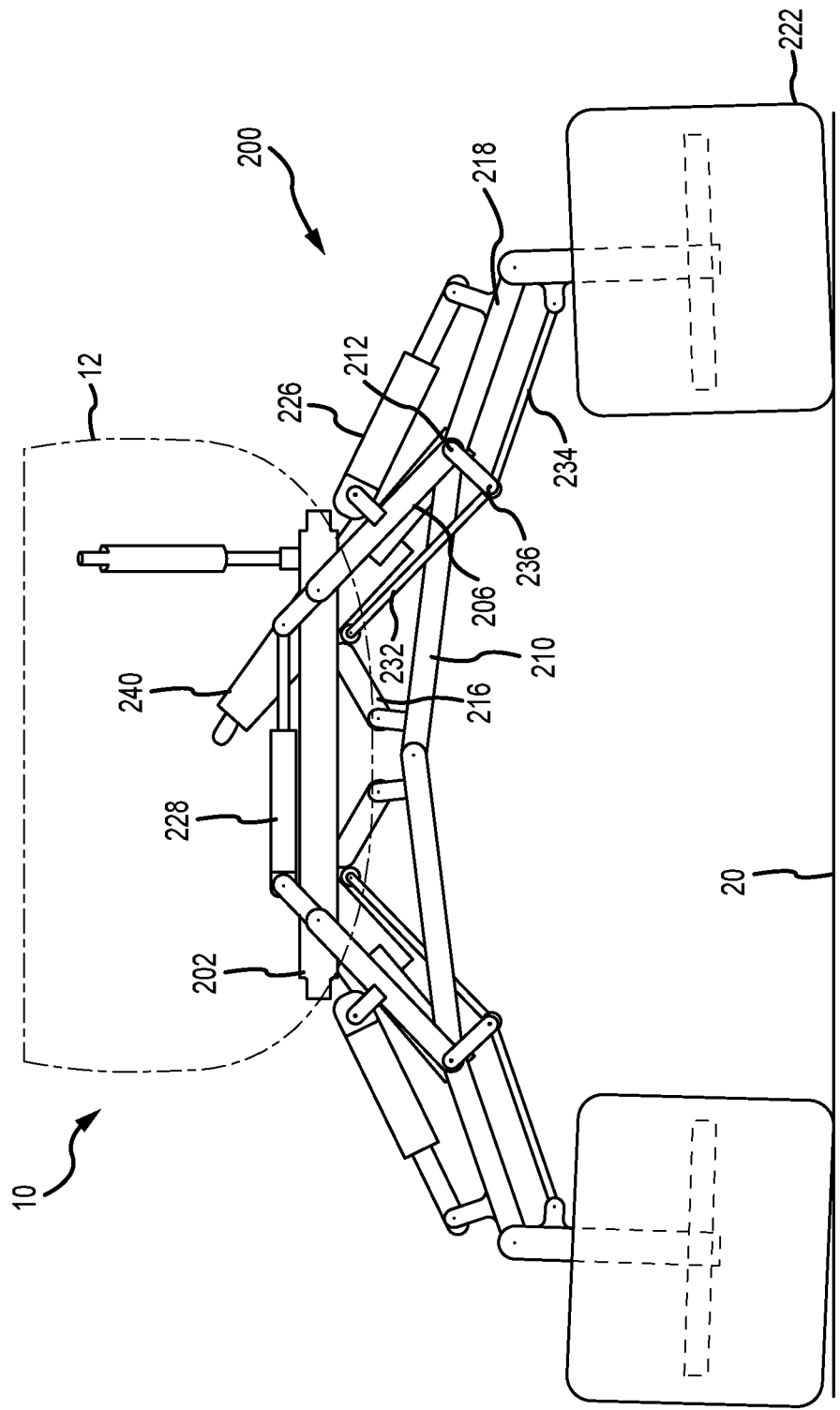
Figure 2C:
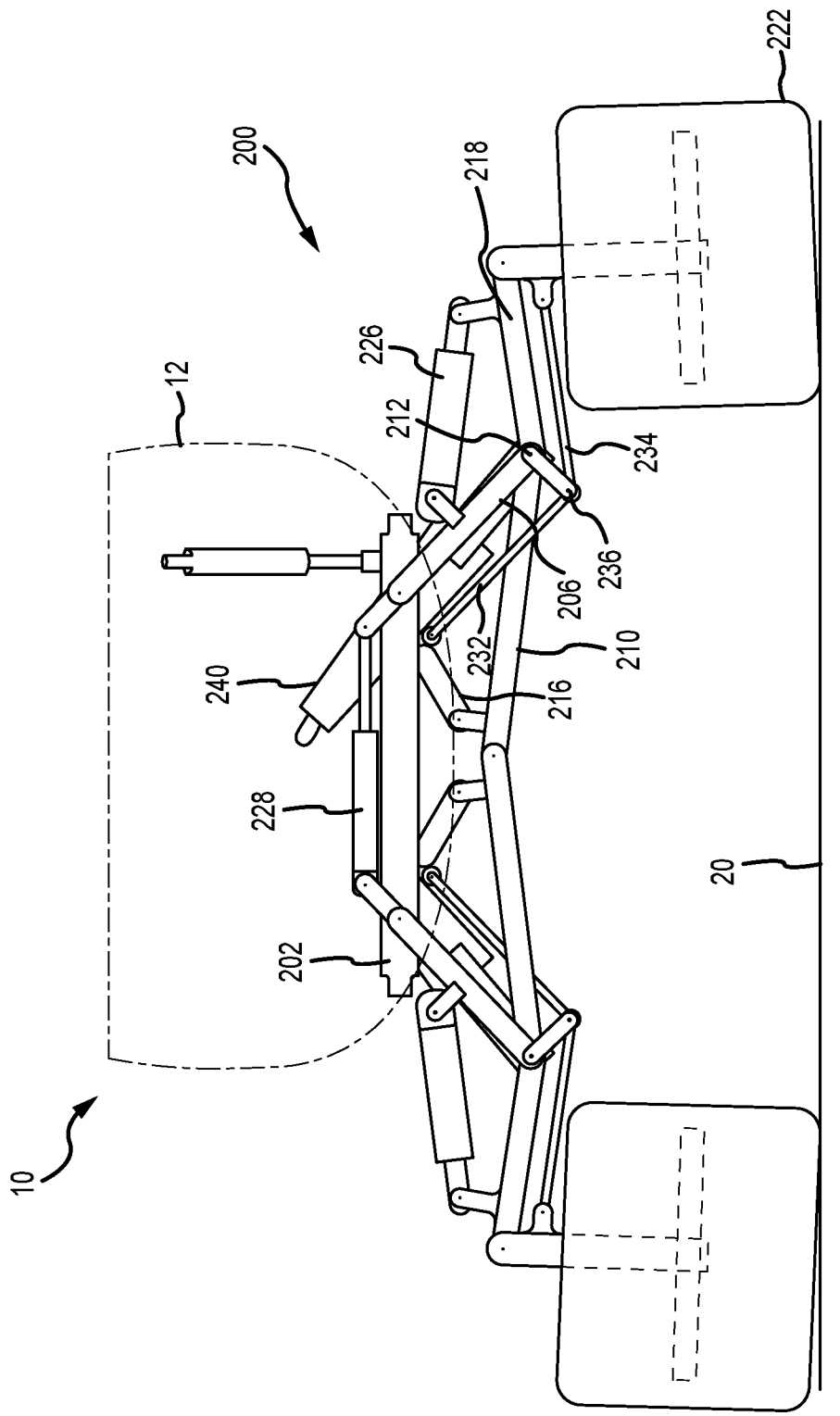

Referring now to FIGS. 2A, 2B and 2C, operation of a landing gear system 200, similar to the landing gear system 100 described above with reference to FIGS. 1A and 1B, is described in relation to landing of an aircraft 10. Similar to the above description, the landing gear system 200 includes, among other components, a truss frame 202, a retraction actuator 204, a first truss link 206, a second truss link 210, a truss locking link 216, a lever 218, a shock absorber 226, an articulation actuator 228, a retraction articulation link 232, a ground articulation link 234 and a drag brace assembly 240. Referring to FIG. 2A, the landing gear system 200 is illustrated in a deployed state, but without loading, such as would occur when the aircraft is approaching a ground surface 20 for landing. In the deployed state without loading, the first truss link 206, the second truss link 210 and the truss locking link 216 assume a locking state relative to the truss frame 202 and are maintained in such state by the articulation actuator 228 assuming a fully retracted state. The drag brace assembly 240 is also in a locked state relative to a frame in a landing gear bay 12 of the aircraft 10.

Referring to FIG. 2B, the landing gear system 200 is illustrated in a shock absorbing state with a load being applied, such as would occur following the aircraft 10 contacting the ground surface 20 during a landing. In the shock absorbing state, the first truss link 206, the second truss link 210 and the truss locking link 216 remain in the locking state relative to the truss frame 202 and the drag brace assembly 240 also remains locked. As illustrated, the shock absorber 226 compresses upon contact with the ground surface 20, absorbing the landing energy, and thereby allowing the lever 218 to articulate upward about a second pivot axis 212 (similar to the second pivot axis 112 described above), which pivotally connects the lever 218 to the first truss link 206 and to the second truss link 210. At the same time, the ground articulation link 234 articulates about a fifth pivot axis 236 (similar to the fifth pivot axis 136 described above), thereby maintaining a parallel orientation with the lever 218 and minimizing scrubbing against the ground surface 20 of a tire 222 connected to the landing gear system 200.

Referring now to FIG. 2C, the landing gear system 200 is illustrated in a fully compressed state with a load being applied, such as would occur following the aircraft 10 completing the landing process. In the fully compressed state, the first truss link 206, the second truss link 210 and the truss locking link 216 remain in the locking state relative to the truss frame 202 and the drag brace assembly 240 also remains locked. As illustrated, the shock absorber 226 is fully compressed as the landing gear system 200 reacts to the full weight of the aircraft 10 following landing. The lever 218 articulates further upward about the second pivot axis 212, which pivotally connects the lever 218 to the first truss link 206 and to the second truss link 210. At the same time, the ground articulation link 234 articulates further about the fifth pivot axis 236, continuing to maintain a parallel orientation with the lever 218 and thereby minimizing scrubbing against the ground surface 20 of the tire 222.

Figure 2D:
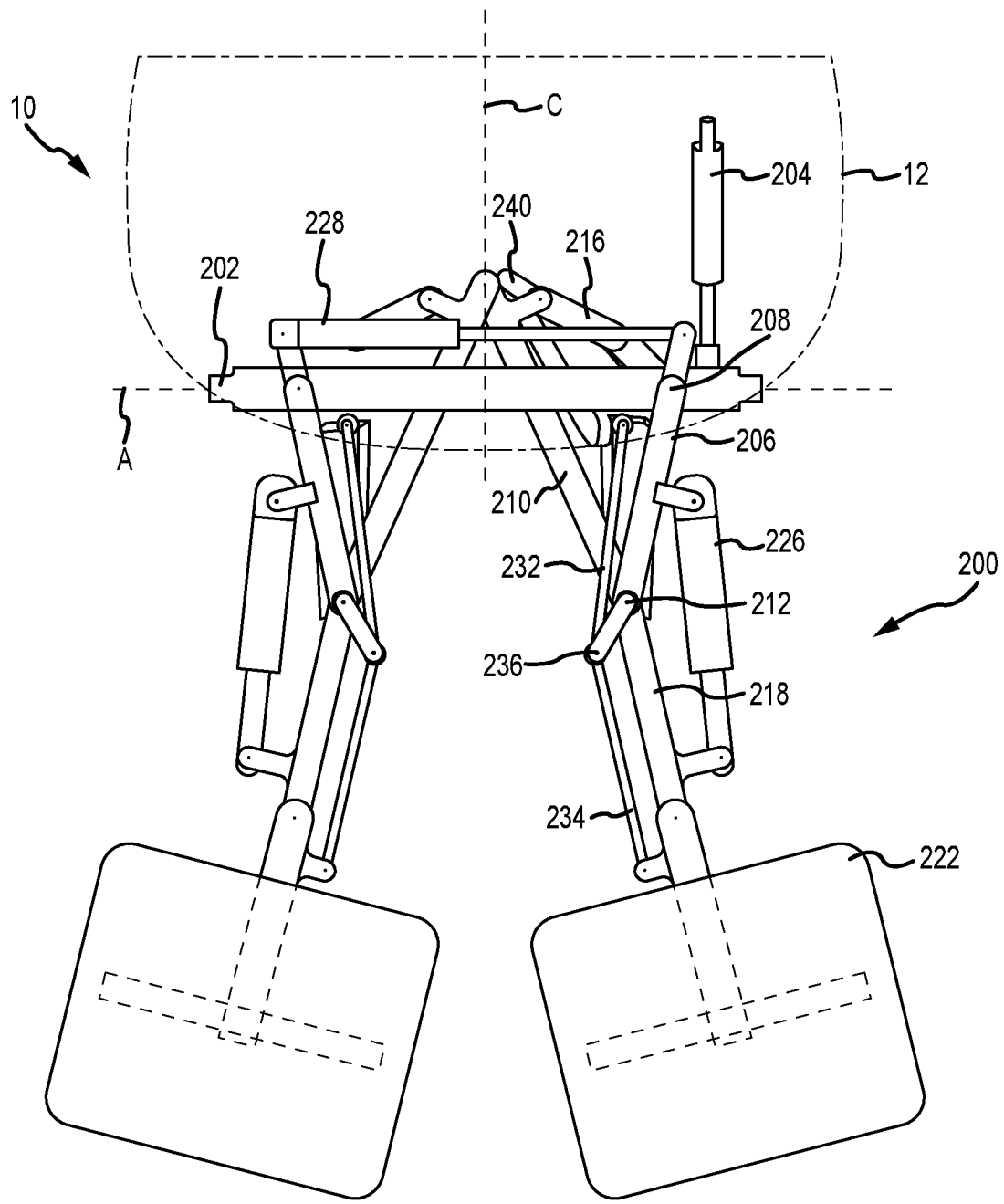
FIGS. 2D, 2E, 2F and 2G illustrate a stowing sequence using a landing gear system, in accordance with various embodiments.
Figure 2E:
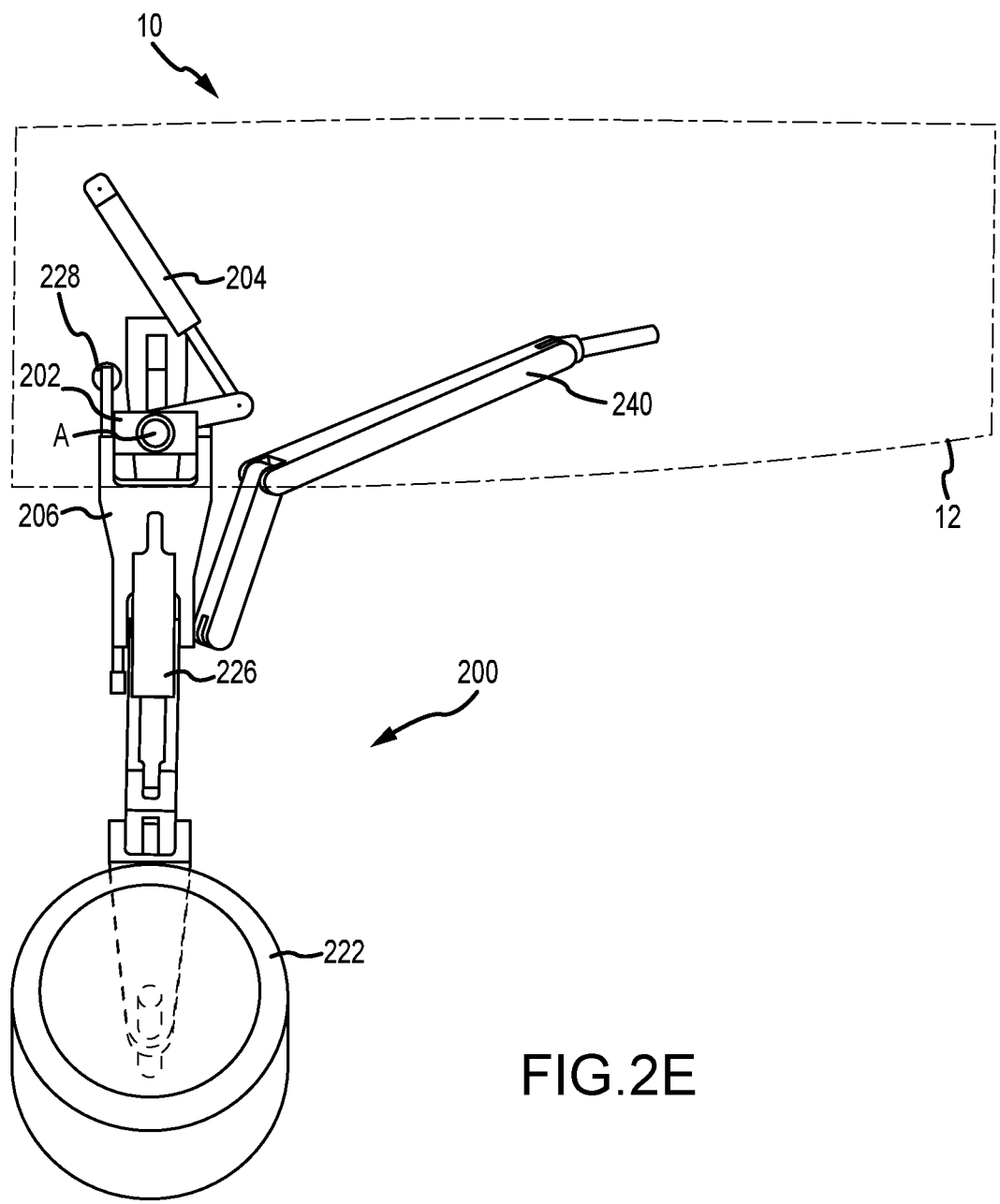
Figure 2F:
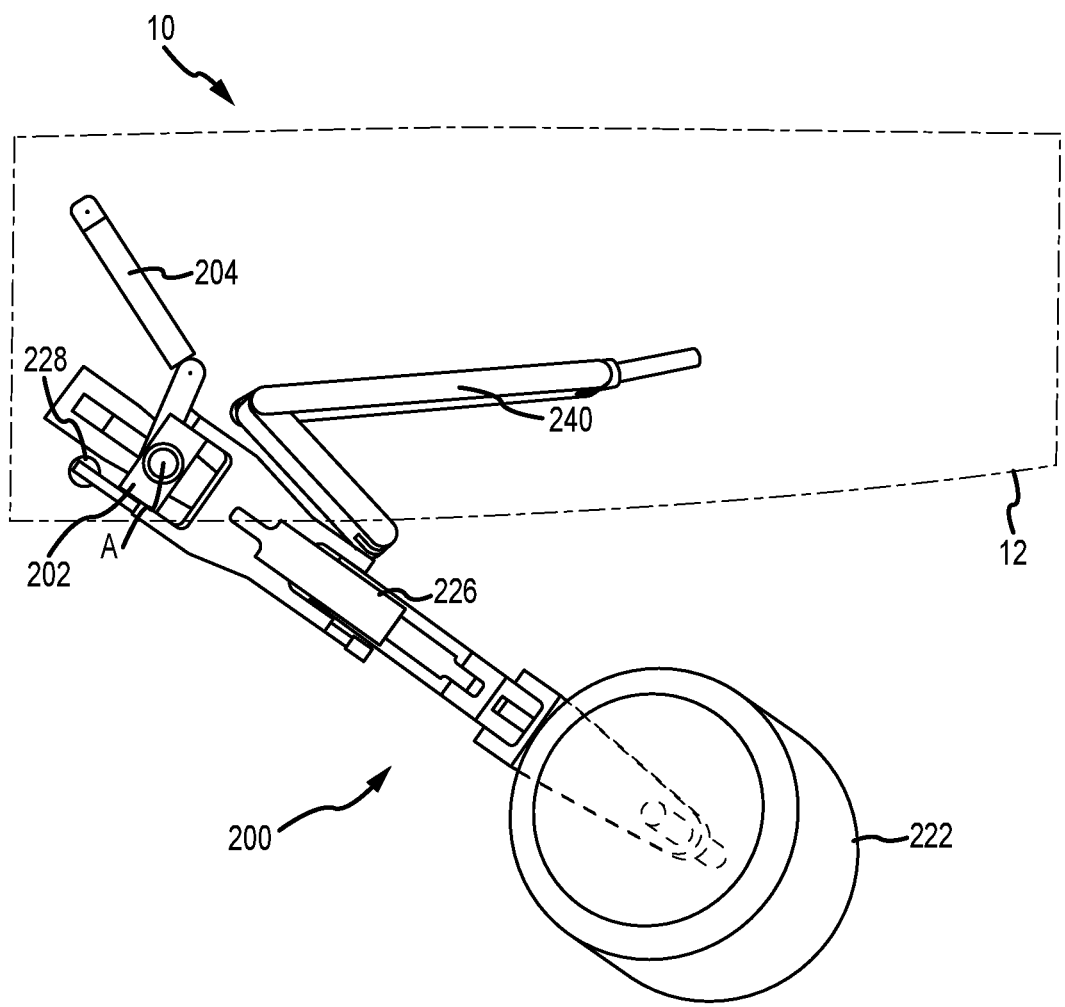
Figure 2G:
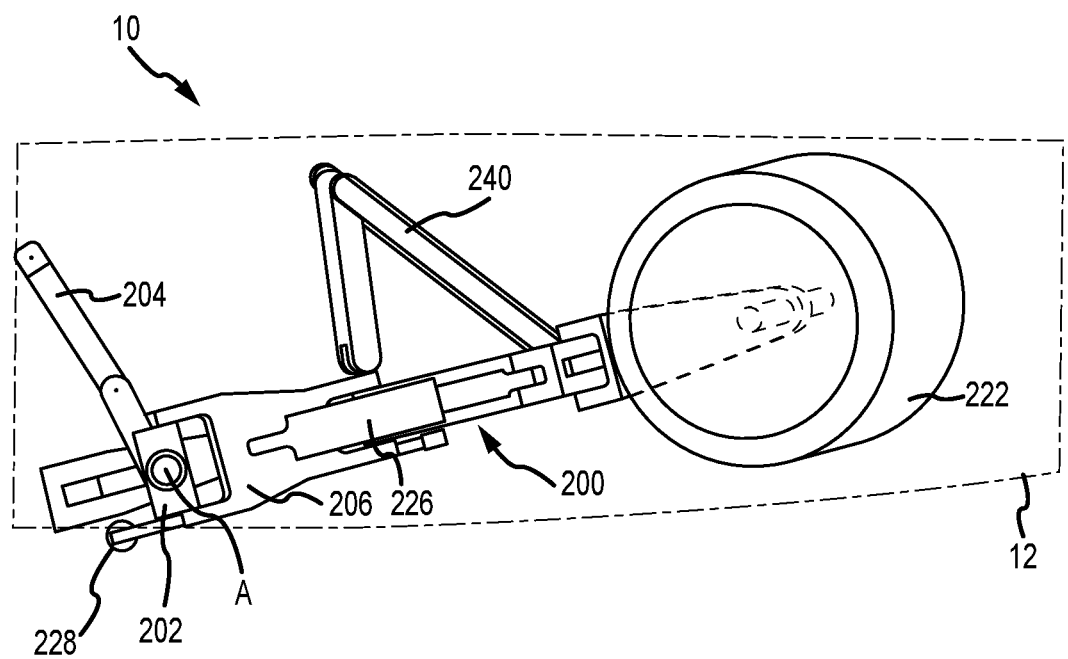

Referring now to FIGS. 2D, 2E, 2F and 2G, operation of the landing gear system 200 is described in relation to the landing gear system being stowed in the landing gear bay 12 of the aircraft 10. In a first step (see FIGS. 2D and 2E), the articulation actuator 228 assumes a fully extended state. Extending the articulation actuator 228 forces the first truss link 206 to pivot about a first pivot axis 208 (similar to the first pivot axis 108 described above), thereby forcing the various components connected at the second pivot axis 212 or otherwise connected to the first truss link 206 to move inward toward a centerline C of the aircraft 10 (the centerline C extending substantially vertically with respect to the aircraft 10 and in a plane that substantially splits the aircraft 10 in a left half and a right half), as illustrated in FIGS. 2D and 2E (FIG. 2E is a side view of the orientation of the landing gear system 200 illustrated in FIG. 2D). As illustrated in FIG. 2F, subsequent to the various components of the landing gear system 200 moving toward the centerline C, the retraction actuator 204 is actuated to pivot the truss frame 202 about the axis A, which, in various embodiments, is disposed perpendicular to the centerline C of the aircraft 10. Pivoting the truss frame 202 about the axis A causes the various components of the landing gear system 200 to rotate up into the landing gear bay 12 of the aircraft 10. As illustrated in FIGS. 2F and 2G, the retraction actuator 204 continues to pivot the truss frame 202 about the axis A until the landing gear system 200 is fully stowed within the landing gear bay 12. In order to deploy the landing gear system 200 from the landing gear bay 12, the various steps just described are reversed. For example, the retraction actuator 204 is actuated to rotate the various components of the landing gear system 200 out of the landing gear bay 12 and into a downward position as shown in FIG. 2D. Once rotated to the downward position, the articulation actuator 228 is retracted, such that the first truss link 206 pivots about the first pivot axis 208, thereby forcing the various components connected at the second pivot axis 212 or otherwise connected to the first truss link 206 to move outward and away from the centerline C of the aircraft 10 as illustrated in FIG. 2A. The landing gear system 200 is then in a fully deployed state and read to land.

Figure 3A:
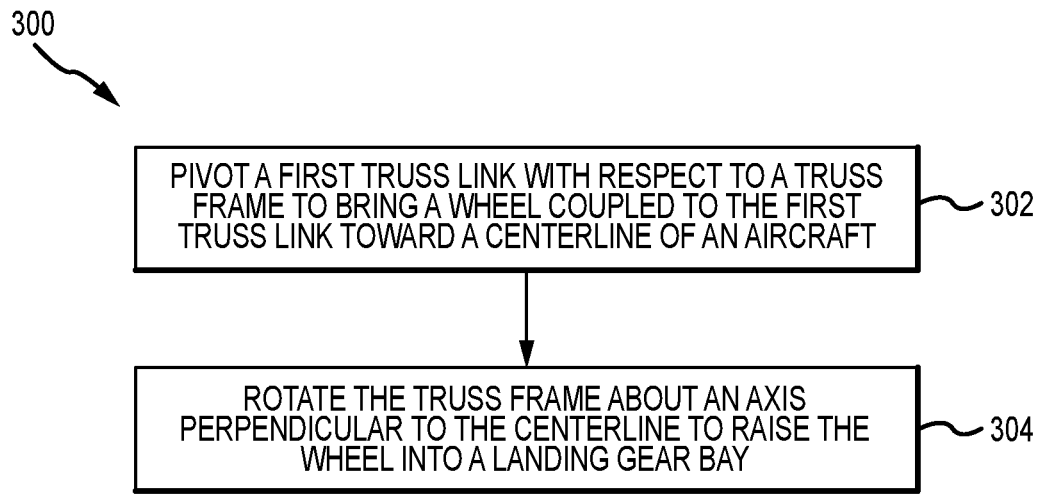
FIGS. 3A and 3B describe methods for stowing and deploying a landing gear system, in accordance with various embodiments.

Referring now to FIG. 3A, a method 300 of stowing a landing gear system for an aircraft having a truss frame pivotally connected to a frame of the aircraft is described. A first step 302 includes pivoting a first truss link with respect to the truss frame to bring a wheel coupled to the first truss link toward a centerline of the aircraft. A second step 304 includes rotating the truss frame about an axis perpendicular to the centerline to raise the wheel into a landing gear bay. In various embodiments, a first actuator is configured to pivot the first truss link with respect to the truss frame and a second actuator is configured to rotate the truss frame about the axis.

Figure 3B:
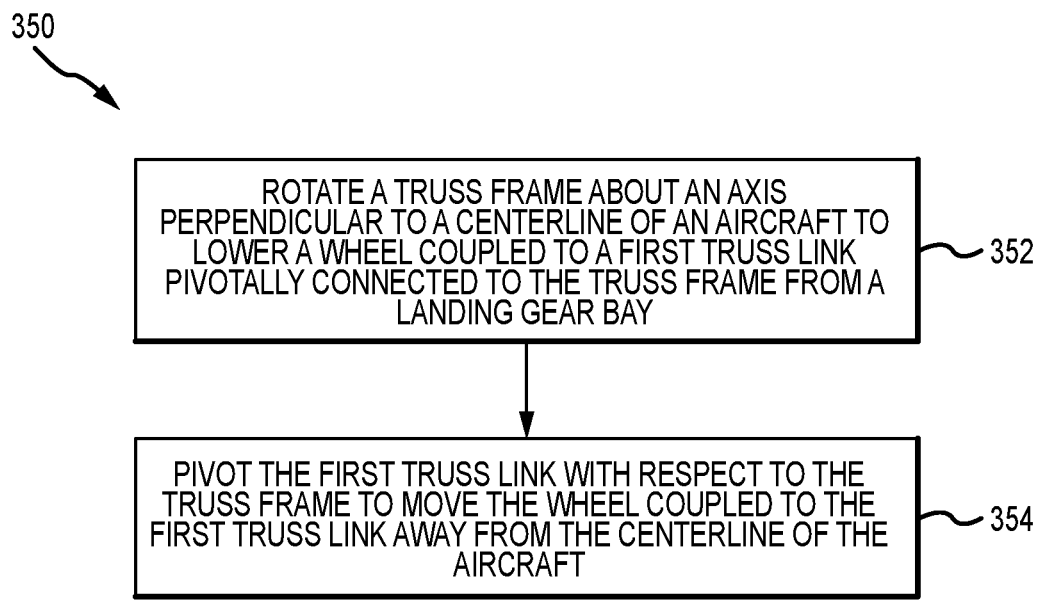

Referring now to FIG. 3B, a method 310 of deploying a landing gear system for an aircraft having a truss frame pivotally connected to a frame of the aircraft is described. A first step 312 includes rotating the truss frame about an axis perpendicular to a centerline of the aircraft to lower a wheel coupled to a first truss link pivotally connected to the truss frame from a landing gear bay. A second step 314 includes pivoting the first truss link with respect to the truss frame to move the wheel coupled to the first truss link away from the centerline of the aircraft. In various embodiments, a first actuator is configured to pivot the first truss link with respect to the truss frame and a second actuator is configured to rotate the truss frame about the axis.

Benefits, other advantages, and solutions to problems have been described herein with regard to specific embodiments. Furthermore, the connecting lines shown in the various figures contained herein are intended to represent exemplary functional relationships and/or physical couplings between the various elements. It should be noted that many alternative or additional functional relationships or physical connections may be present in a practical system. However, the benefits, advantages, solutions to problems, and any elements that may cause any benefit, advantage, or solution to occur or become more pronounced are not to be construed as critical, required, or essential features or elements of the disclosure. The scope of the disclosure is accordingly to be limited by nothing other than the appended claims, in which reference to an element in the singular is not intended to mean "one and only one" unless explicitly so stated, but rather "one or more." Moreover, where a phrase similar to "at least one of A, B, or C" is used in the claims, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C. Different cross-hatching is used throughout the figures to denote different parts but not necessarily to denote the same or different materials.

Systems, methods and apparatus are provided herein. In the detailed description herein, references to "one embodiment," "an embodiment," "various embodiments," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

Numbers, percentages, or other values stated herein are intended to include that value, and also other values that are about or approximately equal to the stated value, as would be appreciated by one of ordinary skill in the art encompassed by various embodiments of the present disclosure. A stated value should therefore be interpreted broadly enough to encompass values that are at least close enough to the stated value to perform a desired function or achieve a desired result. The stated values include at least the variation to be expected in a suitable industrial process, and may include values that are within 10%, within 5%, within 1%, within 0.1%, or within 0.01% of a stated value. Additionally, the terms "substantially," "about" or "approximately" as used herein represent an amount close to the stated amount that still performs a desired function or achieves a desired result. For example, the term "substantially," "about" or "approximately" may refer to an amount that is within 10% of, within 5% of, within 1% of, within 0.1% of, and within 0.01% of a stated amount or value.

In various embodiments, system program instructions or controller instructions may be loaded onto a tangible, non-transitory, computer-readable medium (also referred to herein as a tangible, non-transitory, memory) having instructions stored thereon that, in response to execution by a controller, cause the controller to perform various operations. The term "non-transitory" is to be understood to remove only propagating transitory signals per se from the claim scope and does not relinquish rights to all standard computer-readable media that are not only propagating transitory signals per se. Stated another way, the meaning of the term "non-transitory computer-readable medium" and "non-transitory computer-readable storage medium" should be construed to exclude only those types of transitory computer-readable media that were found by In Re Nuijten to fall outside the scope of patentable subject matter under 35 U.S.C. § 101.

Furthermore, no element, component, or method step in the present disclosure is intended to be dedicated to the public regardless of whether the element, component, or method step is explicitly recited in the claims. No claim element herein is to be construed under the provisions of 35 U.S.C. 112(f) unless the element is expressly recited using the phrase "means for." As used herein, the terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus.

Finally, it should be understood that any of the above described concepts can be used alone or in combination with any or all of the other above described concepts. Although various embodiments have been disclosed and described, one of ordinary skill in this art would recognize that certain modifications would come within the scope of this disclosure. Accordingly, the description is not intended to be exhaustive or to limit the principles described or illustrated herein to any precise form. Many modifications and variations are possible in light of the above teaching.

What is claimed is:

1. A landing gear system for a n aircraft, comprising:
   a truss frame having a longitudinal axis;
   the truss frame pivotally connected to a frame of the aircraft and configured to rotate about the longitudinal axis;
   a retraction actuator configured to rotate the truss frame about the longitudinal axis;
   a first truss link pivotally connected to the truss frame, wherein the first truss link has a first end pivotally connected to the truss frame at a first pivot axis;
   a second truss link pivotally connected to the first truss link, wherein the first truss link has a second end connected to a first end of the second truss link at a second pivot axis, and wherein the second truss link is a left side second truss link having the first end pivotally connected to the second end of the first truss link and a second end pivotally connected to a right side second truss link;
   a truss locking link pivotally connected to the truss frame and to the second truss link; and
   an articulation actuator configured to pivot the first truss link with respect to the truss frame; and
   a lever, wherein the lever has a first end pivotally connected to the first truss link and the second truss link at the second pivot axis and wherein the lever has a second end pivotally directly connected to an axle attachment member.

2. The landing gear system of claim 1, further comprising a shock absorber pivotally connected to the first truss link and to the lever.

3. The landing gear system of claim 2, further comprising a ground articulation link pivotally connected to the axle attachment member.

4. The landing gear system of claim 3, further comprising a retraction articulation link pivotally connected to the truss locking link and to the ground articulation link.

5. The landing gear system of claim 4, further comprising a spacer link connecting the ground articulation link and the retraction articulation link to the first truss link.

6. The landing gear system of claim 1, wherein the first truss link is a left side first truss link and the articulation actuator is configured to pivot the left side first truss link with respect to the truss frame and a right side first truss link with respect to the truss frame.

7. The landing gear system of claim 6, further comprising a ground articulation link pivotally connected to the axle attachment member.

8. The landing gear system of claim 7, further comprising a retraction articulation link pivotally connected to the truss locking link and to the ground articulation link.

9. The landing gear system of claim 1, further comprising a spacer link configured to connect a ground articulation link and a retraction articulation link to the first truss link and to the second truss link at the second pivot axis.

10. The landing gear system of claim 9, wherein the ground articulation link is pivotally connected to the axle attachment member and the retraction articulation link is pivotally connected to the truss locking link.

* * * * *